United States Patent [19]

Biran et al.

[11] Patent Number: 5,627,501

[45] Date of Patent: May 6, 1997

[54] SIGNAL COUPLER WITH AUTOMATIC COMMON LINE ATTENUATION COMPENSATION

[75] Inventors: Bernard Biran, Brussels; Peter P. F. Reusens, Laarne, both of Belgium

[73] Assignee: Alcatel N.V., Rijswijk, Netherlands

[21] Appl. No.: 417,374

[22] Filed: Apr. 5, 1995

[30] Foreign Application Priority Data

Apr. 14, 1994 [EP] European Pat. Off. ............ 94201015

[51] Int. Cl.$^6$ ............................ H04M 11/06; H03H 7/46
[52] U.S. Cl. ...................... 333/17.1; 333/263; 333/126; 379/390
[58] Field of Search ................................. 333/17.1, 124, 333/126, 263; 379/394, 398, 346, 403, 404, 390

[56] References Cited

U.S. PATENT DOCUMENTS

| | | | |
|---|---|---|---|
| 4,443,662 | 4/1984 | Nakhla | 379/30 |
| 4,679,227 | 7/1987 | Hughes-Hartogs | 379/98 |
| 4,742,540 | 5/1988 | Schingh | 379/398 X |
| 5,133,007 | 7/1992 | Nishimura | 379/405 |
| 5,271,060 | 12/1993 | Moran, III et al. | 379/398 X |
| 5,459,440 | 10/1995 | Claridge et al. | 333/17.3 |

OTHER PUBLICATIONS

"Multi-Tone Transmission for Asymmetric Digital Subscriber Lines (ADSL)", K. Sistanizadeh et al, *IEEE Int'l Conference on Communications '93*, vol. 2, May 1993, Geneva, pp. 756–760.

"Telephony Transmission and Splitters, Passive and Active", J. Cook, ANSI/TIE1.5/94–043, Feb. 1994, pp. 1–14.

*Primary Examiner*—Benny Lee
*Assistant Examiner*—Barbara Summons
*Attorney, Agent, or Firm*—Ware, Fressola, Van Der Sluys & Adolphson LLP

[57] ABSTRACT

The present invention relates to a for coupling Plain Old Telephone Service (POTS) signals and Asymmetric Digital Subscriber Line (ADSL) signals to a common line (TL). In order to avoid saturation of inductances (L1,L2,L3,L4) of a low pass POTS filter (LPF) located between the POTS transmitter/receiver (PTR) and this common line (TL) when the POTS signal is not sufficiently attenuated by this common line (TL), a variable impedance (SL) is inserted between the POTS transmitter/receiver (PTR) and this low pass POTS filter (LPF). The value of this variable impedance (SL) is controlled by a control signal (CS) supplied by the ADSL transmitter/receiver (ATR) which measures the attenuation caused by this common line (TL).

9 Claims, 1 Drawing Sheet

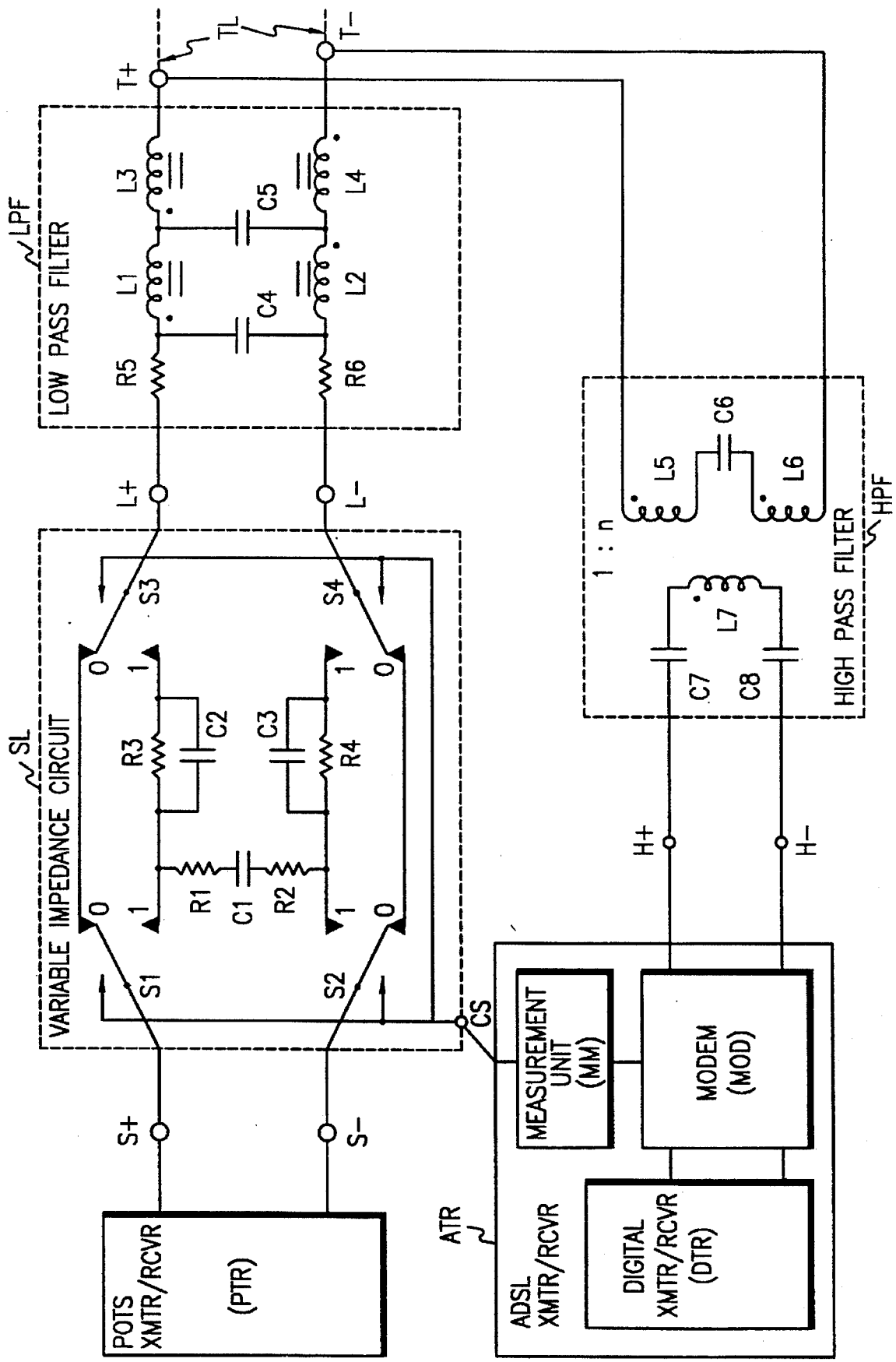

SIGNAL COUPLER WITH AUTOMATIC COMMON LINE ATTENUATION COMPENSATION

TECHNICAL FIELD

The present invention relates to a signal coupler including a first transmission branch for a first signal and a second transmission branch for a second signal, said branches both being coupled to a common transmission line, said first signal having a first frequency spectrum and said second signal having a second frequency spectrum, said first and second frequency spectra being non-overlapping, said first transmission branch including the cascade coupling of a first signal means and a first bandpass filter both adapted to said first frequency spectrum, said second transmission branch including the cascade coupling of a second signal means and a second bandpass filter both adapted to said second frequency spectrum.

BACKGROUND OF THE INVENTION

Such a coupler is already known in the art, e.g. from the contribution Doc. T1E1.4/94-043 to the ANSI/T1 Telecommunications Committee by John Cook, BT Laboratories (BTL). Therein, the first signal is an Asymmetric Digital Subscriber Line (ADSL) signal, whereas the second signal is a Plain Old Telephone Service (POTS) signal. The second signal means is a POTS receiver/transmitter, whereas the first signal means is an ADSL receiver/transmitter. The first bandpass filter is a highpass filter passing the ADSL signal but blocking the POTS signal. The second bandpass filter is a lowpass filter passing the POTS signal but blocking the ADSL signal.

It is not noted in the latter contribution that part of the first signal is lost via the second bandpass filter when the common line does not sufficiently attenuate the second signal, e.g. when the common line is too short. Indeed, when the second signal is too strong, the filter characteristics of the second bandpass filter change so that part of the first signal is lost via the second bandpass filter. Such a change of filter characteristics of the second band pass filter may occur due to changing characteristics of elements included therein e.g. saturation of an inductor due to a large current or saturation of a capacitor due to a large voltage or saturation of a resistor due to large power dissipation.

DISCLOSURE OF INVENTION

An object of the present invention is to provide a a signal coupler of the above known type but wherein loss of part of the first signal via the second bandpass filter due to too strong a second signal when the second signal is not sufficiently attenuated by the common line, is reduced or avoided.

According to the invention, this object is achieved due to the fact that said second transmission branch includes a variable impedance and that said first signal means includes measurement means to measure the attenuation caused by said common line and to generate a control signal adapted to modify the value of said variable impedance.

In this way, the impedance is changed to a value which is such that the second signal is sufficiently attenuated to avoid saturation of the second bandpass filter. Consequently, even in the case of a strong second signal, the filter characteristics of the second bandpass filter do not change, and the second bandpass filter blocks the first signal.

These and other objects, features and advantages of the present invention will become more apparent in light of the detailed description of a best mode embodiment thereof, as illustrated in the accompanying drawing.

BRIEF DESCRIPTION OF THE DRAWING

The sole FIGURE shows a signal coupler according to the invention.

BEST MODE FOR CARRYING OUT THE INVENTION

Referring to the drawing, this signal coupler includes two transmission branches coupled to a common twisted pair telephone line TL, over which both Plain Old Telephone Service (POTS) signals and Asymmetric Digital Subscriber Line (ADSL) signals may be transmitted in both directions. The POTS frequency spectrum ranges from 0 to 4 kHz, whereas the ADSL frequency spectrum ranges from 24 kHz to 1100 kHz. A first of these branches includes the cascade connection of an ADSL transmitter/receiver ATR and a highpass filter HPF. A second of these branches includes the cascade connection of a POTS transmitter/receiver PTR, a variable impedance circuit SL and a lowpass filter LPF. ATR includes a digital transmitter/receiver DTR coupled to a modem MOD and a measurement unit MM also coupled to MOD. The measurement unit MM provides a control signal CS to a like named control terminal of SL. The pairs of terminals between PTR, SL, LPF and TL are labelled S+ S−, L+ L− and T+ T− respectively, whereas those between ATR, HPF and TL are indicated by H+ H− and T+ T− respectively.

SL includes an electronic switching unit which has two possible states 0 and 1, and which is schematically represented by four change-over switches S1,S2,S3 and S4 having two possible states 0 and 1 imposed when CS is deactivated and activated respectively. In state 0 of the switching unit, i.e. when CS is deactivated, S+ S− is short circuited to L+ L−, whereas in state 1, when CS is activated, S+ S− is coupled to L+L− via a RC impedance network which then connects S+ to S− via the series connection of a resistor R1, a capacitor C1 and a resistor R2, and which moreover connects S+ to L+ via a resistor R3 in parallel with a capacitor C2 and connects S− to L− via a resistor R4 in parallel with a capacitor C3. The control signal CS thus allows the variable impedance of SL to be changed to one of its two possible values i.e. 0 and the value of the RC impedance network. It has to be noted that other RC impedance networks may perform equally well, provided that they attenuate the POTS signal without distortion and that they do not affect the lowpass characteristics of LPF. Although in this case SL has only two possible values, SL may have a plurality of possible values and may even be designed so as to be able to smoothly change its value between a minimum and a maximum value.

LPF includes the series connection of a resistor R5, a series inductor L1 and a series inductor L3 connecting L+ to T+ and a resistor R6, a series inductor L2 and a series inductor L4 in series connecting L− to T−. L1 and L2 are inductively coupled inductors as are L3 and L4. The junction point of R5 and L1 is connected to that of R6 and L2 via a shunt capacitor C4, while the junction point of L1 and L3 is connected to that of L2 and L4 via a shunt capacitor C5.

LPF may, e.g. be a fourth order low pass filter and the series inductors each may have a ferromagnetic core to obtain a sufficiently high inductance value, thereby achieving a 3dB point frequency of 6 kHz and 80 dB per decade decay of the filter lowpass characteristics. The resistors R5 and R6 determine the DC attenuation whereas the shunt capacitors C4 and C5 together with the series inductors L1,L2,L3 and L4 determine the fourth order behaviour of LPF.

When the POTS signal is too strong, the series inductors L1,L2,L3 and L4 of LPF saturate e.g. when the POTS signal is constituted by a so-called ringing current. The inductance of an inductor when thus saturated, is smaller than its inductance when not saturated. For a frequency f and an inductance 1, the impedance of a series inductor is $2\pi j \times f \times 1$, so that the attenuation caused by this series inductor decreases as 1 decreases due to saturation, and that a same attenuation is only reached at higher frequencies. This decrease causes the 3 dB point of LPF to change to a significantly higher frequency. Consequently LPF will also pass the lower part of the ADSL frequency spectrum and a significant part of the ADSL signal is thus lost via LPF.

HPF includes a transformer having a primary winding L7 and two identical secondary windings L5 and L6. H+ is connected to H− via the series connection of a capacitor C7, L7 and a capacitor C8. T+ is connected to T− through L5, a capacitor C6 and L6 in series. C6 blocks DC signals supplied via TL and the transformer reduces the ADSL signal voltage by a factor n towards ATR, whereas it increases the ADSL signal voltage by a factor n towards TL. HPF is a third order high pass filter having a 3 dB point frequency of 24 kHz and 60 dB per decade decay of the filter highpass characteristics. It is to be noted that a change in the filter characteristics of LPF due to saturation of L1,L2,L3 and L4 does not significantly change these highpass characteristics of HPF.

ATR includes a high speed modem MOD which is able to transmit and receive data over the telephone line TL and is of the type that encodes data elements on a set of carrier frequencies, in the way described e.g. in U.S. Pat. No. 4679227. In order to optimize the allocation of data and power to these carrier frequencies, the power loss at two predetermined frequencies of the ADSL frequency spectrum is measured and stored by MOD before data is transmitted. This power loss is indicative of the attenuation caused by TL, for POTS signals as well as for ADSL signals although these two predetermined frequencies lie within the ADSL frequency spectrum.

The measurement unit MM measures the attenuation caused by TL, using the above measurements stored by MOD. When this attenuation is above a predetermined threshold, the control signal CS provided by MM is deactivated. If on the contrary this attenuation is below this predetermined threshold, CS is activated. This predetermined threshold is the minimum attenuation needed to avoid saturation of L1,L2,L3 and L4 by the POTS signal.

Before this attenuation caused by TL is measured, CS is deactivated. Eventual saturation of L1,L2,L3 and L4 during the measurement of the power loss at these two predetermined frequencies does not result in significant additional power loss at these frequencies via LPF. Consequently it does not matter whether or not PTR is sending or receiving a POTS signal and how strong this POTS signal is at the time of this measurement of the attenuation caused by TL. This attenuation caused by TL is measured only once before ADSL data transfer. Afterwards CS is either activated or deactivated only once. It is to be noted that this measurement can be repeated after a predetermined time interval or that a more complex set of rules can be used to generate a control signal.

Thus, when CS is deactivated, a POTS signal received via TL is passed by LPF and supplied directly to PTR, whereas a POTS signal transmitted by PTR is supplied directly to LPF and passed on to TL. On the other hand, when CS is activated, a POTS signal received via TL is passed by LPF, attenuated by SL and then supplied to PTR, whereas a POTS signal transmitted by PTR is attenuated by SL and then supplied to LPF and passed to TL.

In either case, the POTS signal is blocked by HPF. Furthermore, an ADSL signal received via TL is passed by HPF and supplied to ATR, whereas an ADSL signal transmitted by ATR is passed by HPF and supplied to TL. In both cases, the ADSL signal is blocked by LPF.

The reason for the RC network to be inserted between PTR and LPF is that in this way saturation of L1,L2,L3 and L4 is avoided if the signal supplied to the POTS transmission branch either by PTR or by TL is not sufficiently attenuated by TL, such insufficient attenuation being indicated by the fact that CS is activated.

While the principles of the invention have been described above in connection with specific apparatus, it is to be clearly understood that this description is made only by way of example and not as a limitation on the scope of the invention.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Signal coupler including a first branch (ATR, HPF) for transmission and receipt of a first signal and a second branch (PTR, SL, LPF) for transmission and receipt of a second signal, said first and second branches both being coupled to a common transmission line (TL), said first signal having a first frequency spectrum and said second signal having a second frequency spectrum, said first and second frequency spectra being non-overlapping, said first branch including the cascade coupling of a first signal means (ATR) and a first bandpass filter (HPF) both adapted to said first frequency spectrum, said second branch including the cascade coupling of a second signal means (PTR) and a second bandpass filter (LPF) both adapted to said second frequency spectrum, wherein said second branch includes a variable impedance (SL) and said first signal means (ATR) includes measurement means (MM) to measure attenuation caused by said common line (TL) and to generate a control signal (CS) adapted to modify the value of said variable impedance (SL).

2. Signal coupler according to claim 1 wherein said second bandpass filter (LPF) includes at least one element (L1, L2, L3, L4) of which the value changes when said second signal exceeds a predetermined threshold.

3. Signal coupler according to claim 2 wherein each one of said at least one element (L1, L2, L3, L4) is an inductor.

4. Signal coupler according to claim 3 wherein each said inductor has a ferromagnetic core.

5. Signal coupler according to claim 1 wherein said control signal (CS) increases said variable impedance value when said attenuation is below a predetermined threshold and decreases said variable impedance value when said attenuation is above a predetermined threshold.

6. Signal coupler according to claim 1 wherein said variable impedance (SL) includes a first impedance and a second impedance and switching means (S1, S2, S3, S4) controlled by said control signal (CS) and adapted to selectively insert said first impedance or said second impedance in said second branch.

7. Signal coupler according to claim 6 wherein said first impedance is constituted by an electric short circuit whereas said second impedance is constituted by an RC impedance network which substantially attenuates said second signal without distortion and without affecting a bandpass characteristic of said second bandpass filter (LPF).

8. Signal coupler according to claim 7 wherein said RC impedance network includes a first and a second series branch, said first series branch including a first resistor (R3) in parallel with a first capacitor (C2), said second series branch including a second resistor (R4) in parallel with a second capacitor (C3), said first and said second branch being shunted by a series connection of a third resistor (R1), a third capacitor (C1) and a fourth resistor (R2), first terminals being constituted by shunted ends of said first and second series branches and second terminals being constituted by non-shunted ends of said first and second series branches.

9. Signal coupler according to claim 1 wherein said second bandpass filter (LPF) includes a first and a second series branch, said first series branch including a series connection of a fifth resistor (R5), a first inductor (L1) and a second inductor (L3), said second series branch including a series connection of a sixth resistor (R6), a third inductor (L2) and a fourth inductor (L4), wherein a junction between said first inductor (L1) and said fifth resistor is capacitively (C4) coupled to a junction between said third inductor (L2) and said sixth resistor, wherein a junction between said third inductor (L2) and said fourth inductor (L4) is capacitively (C5) coupled to a junction between said first inductor (L1) and said second inductor (L3).

\* \* \* \* \*

UNITED STATES PATENT AND TRADEMARK OFFICE
CERTIFICATE OF CORRECTION

PATENT NO. : 5,627,501
DATED : May 6, 1997
INVENTOR(S) : Biran et al

It is certified that error appears in the above-identified patent and that said Letters Patent is hereby corrected as shown below: On the title page:

Item [57], line 2, prior to "for", please insert --signal coupler--.

Signed and Sealed this

Second Day of December, 1997

*Attest:*

BRUCE LEHMAN

*Attesting Officer*     *Commissioner of Patents and Trademarks*